US012000296B2

(12) United States Patent
Johnson et al.

(10) Patent No.: US 12,000,296 B2
(45) Date of Patent: Jun. 4, 2024

(54) SEAL FOR A ROTOR

(71) Applicant: General Electric Company, Schenectady, NY (US)

(72) Inventors: Steven Douglas Johnson, Milford, OH (US); Neelesh Nandkumar Sarawate, Pleasanton, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/676,929

(22) Filed: Feb. 22, 2022

(65) Prior Publication Data

US 2023/0265767 A1 Aug. 24, 2023

(51) Int. Cl.

| | |
|---|---|
| ***F01D 11/02*** | (2006.01) |
| ***F01D 5/02*** | (2006.01) |
| ***F01D 9/02*** | (2006.01) |
| ***F01D 11/00*** | (2006.01) |
| ***F01D 11/12*** | (2006.01) |
| ***F01D 25/04*** | (2006.01) |

(52) U.S. Cl.

CPC ............... *F01D 25/04* (2013.01); *F01D 5/02* (2013.01); *F01D 9/02* (2013.01); *F01D 11/001* (2013.01); *F01D 11/127* (2013.01); *F05D 2240/56* (2013.01); *F05D 2260/96* (2013.01)

(58) Field of Classification Search

CPC .. F01D 11/127; F05D 2240/56; F16J 15/3288
See application file for complete search history.

(56) References Cited

U.S. PATENT DOCUMENTS

| | | | |
|---|---|---|---|
| 4,645,424 A | 2/1987 | Peters | |
| 5,498,139 A | 3/1996 | Williams | |
| 5,630,590 A | 5/1997 | Bouchard et al. | |
| 9,255,486 B2 * | 2/2016 | Lu | F16J 15/3288 |
| 9,863,538 B2 | 1/2018 | Duguay | |
| 9,963,992 B2 | 5/2018 | Zheng et al. | |
| 10,208,674 B2 * | 2/2019 | Lutjen | F16J 15/328 |
| 10,400,896 B2 * | 9/2019 | Davis | F01D 11/005 |
| 10,519,793 B2 * | 12/2019 | Hiernaux | F16J 15/3288 |
| 10,533,567 B2 * | 1/2020 | Juh | F04D 29/044 |
| 10,683,769 B2 | 6/2020 | Sarawate et al. | |
| 10,837,303 B2 * | 11/2020 | Song | F01D 11/127 |
| 10,844,741 B2 | 11/2020 | Theratil et al. | |

* cited by examiner

*Primary Examiner* — Courtney D Heinle
*Assistant Examiner* — Danielle M. Christensen
(74) *Attorney, Agent, or Firm* — Dority & Manning, P.A.

(57) ABSTRACT

A seal for a rotor is provided. The rotor defines an axial direction, a circumferential direction, and a radial direction. The seal includes a first flexible element coupled to the rotor. The first flexible element extends in a first direction that is within forty five degrees of the axial direction.

12 Claims, 7 Drawing Sheets

SEAL FOR A ROTOR

FIELD

The present disclosure relates to a seal for a rotor, such as a seal for a rotor of a gas turbine engine.

BACKGROUND

Rotary machines often include component assemblies that have a rotor, which is a rotatable component, that is adjacent to a stator, which does not rotate with the stator. The rotor of the component assembly can sometimes have a thermal coefficient of expansion that is different than the stator that it is adjacent to. As such, the rotor and the stator are spaced apart to accommodate for the thermal growth of the rotor in relation to the stator. However, spacing apart the stator from the rotor can cause a fluid, such as a gas or a liquid, to leak between the stator and the rotor, which may be undesirable. As such, seals are often provided to prevent the fluid from traversing through the space between the rotor and the stator. The inventors of the present disclosure have come up with various configurations and devices that improve on currently known seals.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
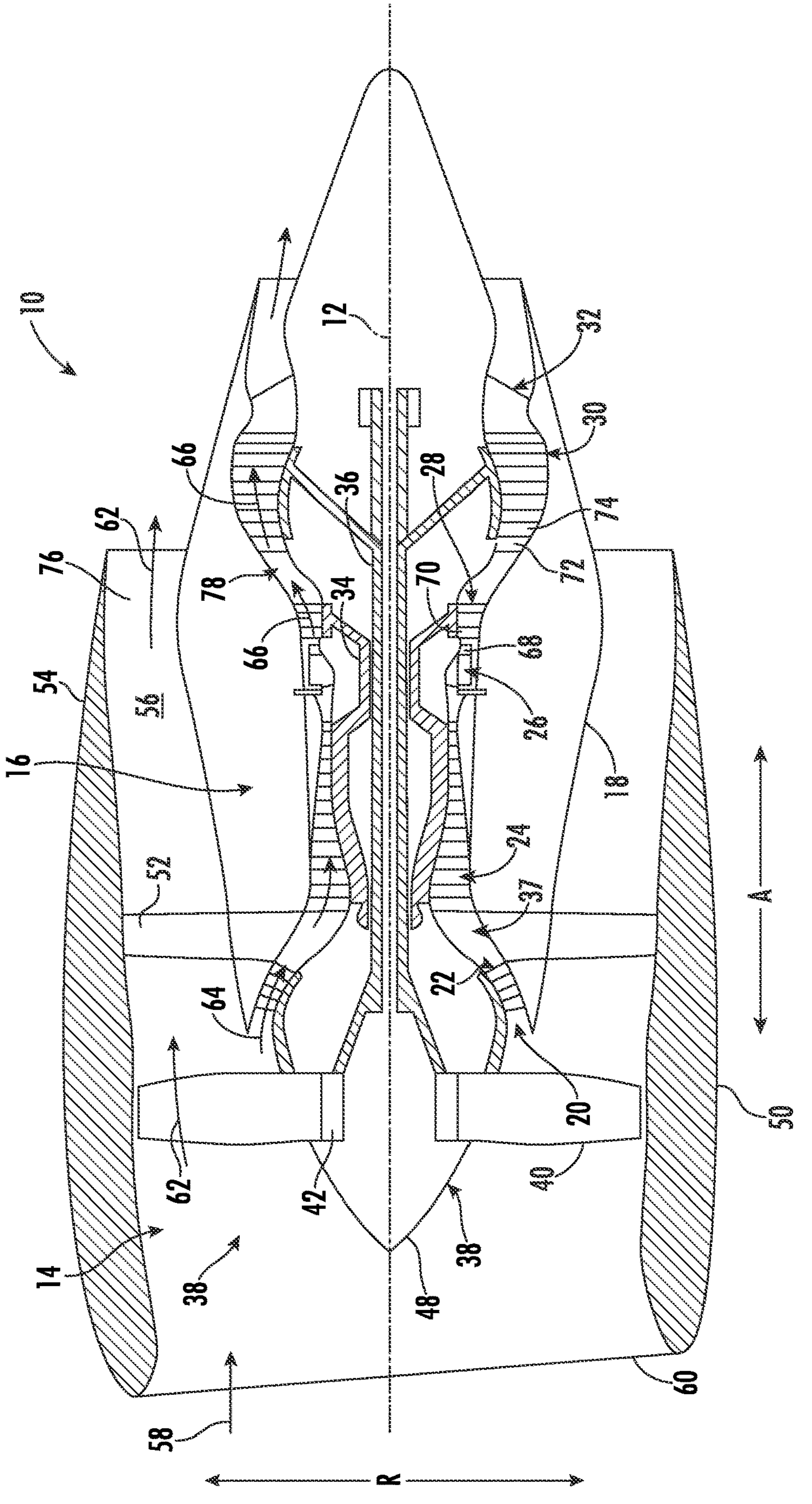
FIG. 1 is a schematic, cross-sectional view of a gas turbine engine, according to an example embodiment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source.

Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The present disclosure is generally related to a seal for a rotor, such as a rotor of a rotary machine. The seal can be provided to prevent a fluid, such as a gas or a liquid, from leaking between the rotor and a stator. In the example of a gas turbine engine, the seal can be provided to prevent a hot gas from leaking between the rotor and the stator, which may be undesirable.

In at least one example, the seal can include a first flexible element and a second flexible element. The first flexible element can be provided to form an axial interface with the shroud and the second flexible element can be provided to form a radial interface with the shroud. As will be appreciated from the discussion herein, providing both an axial and a radial interface with the shroud may decrease the amount of fluid that leaks between the rotor and the stator.

In at least one example, the seal is coupled to, and rotatable with, the rotor. When the rotor is rotating, the seal experiences a centrifugal force in the radial direction. The centrifugal force may cause the flexible elements to be pushed radially outward, causing the flexible elements to make contact with, or be in close proximity to, the stator, which may decrease the amount of fluid that leaks between the rotor and the stator.

In at least one example, the seal can include a first flexible element and a second flexible element. When the rotary machine that the seal is installed on is operating in a relatively hot state the first flexible element can be in close proximity to the stator. However, due to differing thermal expansions between the rotor and the stator, the first flexible element may not be in close proximity to the stator when the rotary machine is operating in a relatively cool state. As such, the second flexible element can be provided and positioned to be in close proximity to the stator when the rotary machine is operating in a relatively cool state. Providing a first flexible element that is in close proximity to the stator when the rotary machine is operating in a relatively hot state and a second flexible element that is in close proximity to the stator when the rotary machine is operating in a relatively cool state may allow for the amount of fluid that leaks between the rotor and the stator to be reduced in both the relatively hot state and the relatively cool state.

In at least one example, the first flexible elements of the seal can include brush bristles. The brush bristles of the first flexible elements can create a curtain effect that may reduce the amount of fluid that leaks between the rotor and the stator. Also, the brush bristles may allow for radial and axial movement between the rotor and the stator due to differing rates of thermal expansion.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and jet exhaust nozzle section 32 together define a core air flowpath 37.

For the embodiment depicted, the fan section 14 includes a fan 38 having a plurality of fan blades 40 coupled to a rotor disk 42 in a spaced apart manner. As depicted, the fan blades 40 extend outwardly from rotor disk 42 generally along the radial direction R. The rotor disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. It should be appreciated that the nacelle 50 may be configured to be supported relative to the turbomachine 16 by a plurality of circumferentially-spaced outlet guide vanes 52. Moreover, a downstream section 54 of the nacelle 50 may extend over an outer portion of the turbomachine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured as a variable pitch fan including, e.g., a suitable actuation assembly for rotating the plurality of fan blades about respective pitch axes, the turbofan engine 10 may be configured as a geared turbofan engine having a reduction gearbox between the LP shaft or spool 36 and fan section 14, etc. It should also be appreciated, that in still other exemplary embodiments, aspects of the present disclosure may be incorporated into any other suitable gas turbine engine. For example, in other exemplary embodiments, aspects of the present disclosure may be incorporated into, e.g., turboprop engine.

Figure 2:
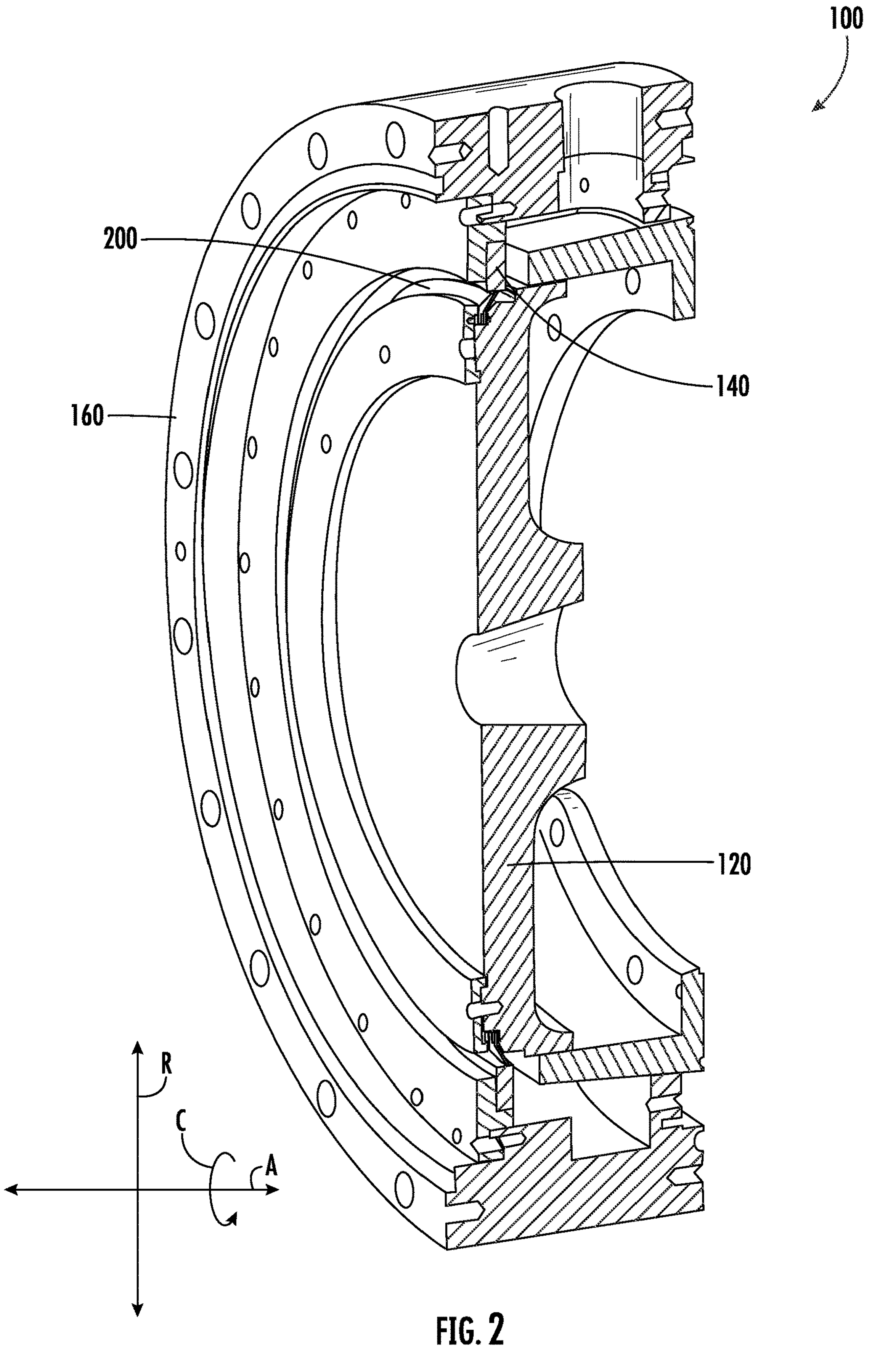
FIG. 2 is a perspective, cross-sectional view of a component assembly of a rotary machine, according to an example embodiment.

Referring now to FIG. 2, a perspective, cross-sectional view of a component assembly 100 of a rotary machine, such as turbofan engine 10 (FIG. 1), is shown, according to one example embodiment. Even though the component assembly 100 will be frequently described in relation to the turbofan engine 10, it should be understood that the present invention is applicable to other rotary machines, such as a steam turbine.

The component assembly 100 of the rotary machine can include a rotor 120 and a stator 140. The rotor 120 can define an axial direction A, a circumferential direction C, and a radial direction R. The radial direction R being perpendicular to the axial direction A, and the circumferential direction C being defined around the axial direction A.

The rotor 120 can be configured so that it is rotatable about the axial direction A. As shown, the stator 140 can extend at least partially in the circumferential direction C and at least partially around the rotor 120. Also, the stator 140 can be configured so that it is not rotatable so that it remains stationary, in relation to other components of the rotary machine upon which it is installed.

In this example, the rotor 120 is coupled to, and rotatable with, the LP shaft or spool 36 of the turbofan engine 10 (FIG. 1). However, in other examples, the rotor 120 is coupled to, and rotatable with, the HP shaft or spool 34 of the turbofan engine 10 (FIG. 1). The stator 140 can be coupled to, either directly or indirectly, other non-rotating components, such as a casing 160 that can surround, at least partially, the stator 140.

The component assembly 100 of the rotary machine can include a seal 200. The seal 200 can be coupled to the rotor 120 and positioned between the stator 140 and the rotor 120. The seal 200 can extend circumferentially around the rotor 120, either partially or fully. As will be explained in more detail, the seal 200 can be provided to prevent fluid leakage between the stator 140 and the rotor 120 by creating a curtain effect. When the rotary machine is a gas turbine engine, such as turbofan engine 10 (FIG. 1), the seal 200 can be provided to prevent a hot gas from flowing from a location that is forward of the component assembly 100 (left side of the page) to a location that is aft of the component assembly 100 (right side of the page). More particularly, the seal 200 may prevent the hot gas from flowing from a position forward of the seal 200 to a position aft of the seal 200.

Figure 3:
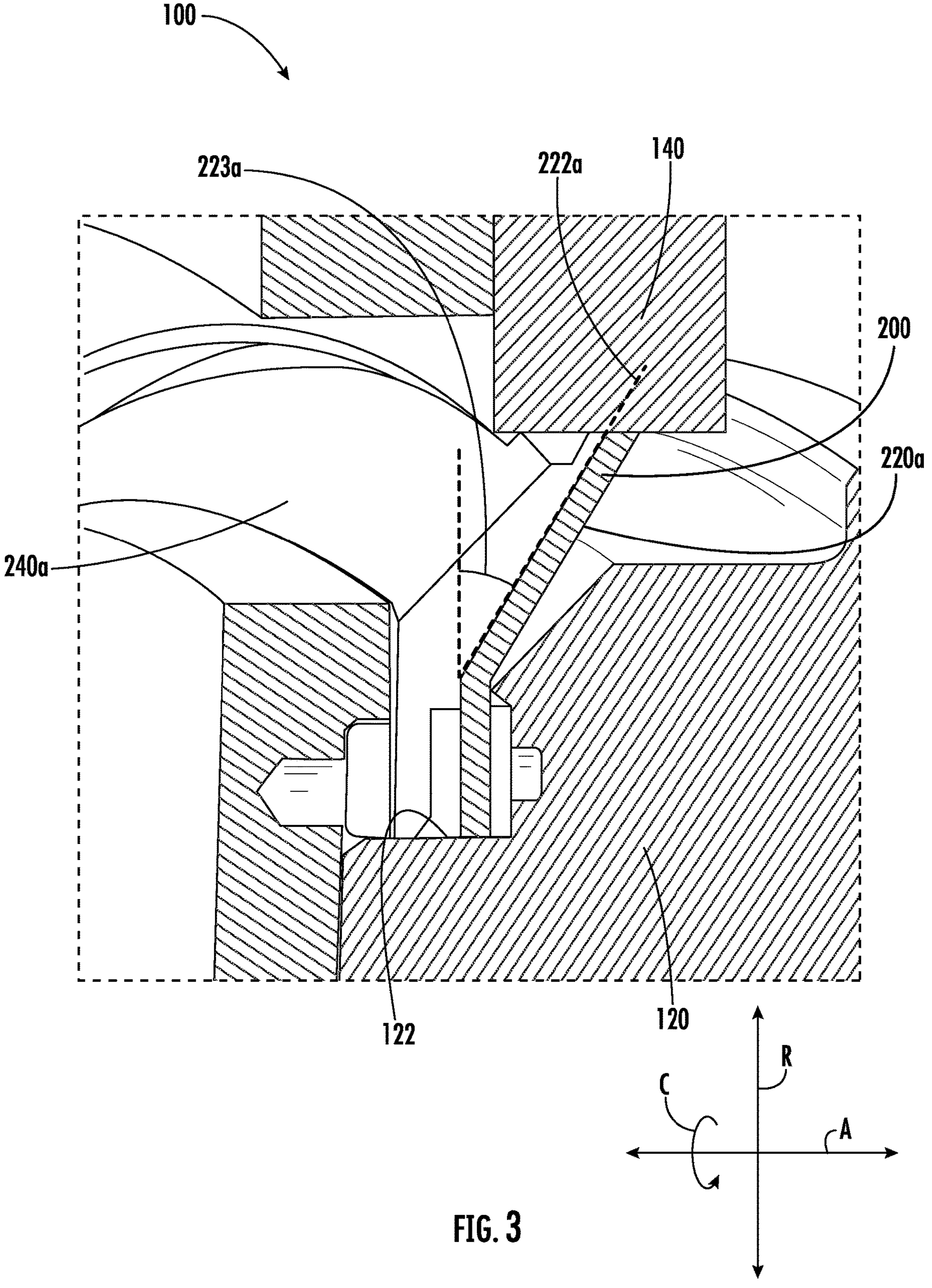
FIG. 3 is a perspective, cross-sectional view of a portion of the component assembly of FIG. 2, according to an example embodiment.

Referring now to FIG. 3, a portion of the component assembly 100 of the rotary machine of FIG. 2 is shown, according to one example embodiment. In this example, the seal 200 extends from a circumferentially extending surface 122 of the rotor 120 of the component assembly 100. The seal 200 includes a first flexible element **220*a*. The first flexible element 220*a* can be an assembly of a plurality of first flexible elements 220*a* that extend partially around the rotor 120, but can be assembled together, in close proximity, to extend fully around the rotor 120. In other examples, the first flexible element 220*a* is not an assembly and can extend fully around the rotor 120**.

The thickness of the first flexible element **220*a* along the axial direction A can be from 0.5 millimeter (mm) to five mm. The first flexible element 220*a* can include a plurality of brush bristles (shown schematically as a single cross-section for clarity). Each brush bristle of the plurality of brush bristles can be substantially cylindrical shaped, with a diameter of less than 0.5 mm, such as between 0.15 and 0.25 mm. The diameter of each brush bristle may vary in relation to other brush bristles in the plurality of brush bristles. For example, smaller diameter brush bristles can be located within the axial center of the plurality of brush bristles, as compared to the brush bristles that are located at the forward and aft axial positions. The brush bristles can be manufactured from a metal. For example, the brush bristles can be manufactured from a nickel alloy, a cobalt alloy, or a stainless steel. The brush bristles can be coupled to the rotor 120** by welding or with a mechanical fastener.

In other examples, the first flexible element **220*a* can include a plurality of circumferentially-spaced flexible fingers. In yet other examples, the first flexible element 220*a* can include at least one circumferentially-extending thin plate. In some embodiments, the at least one thin plate is a plurality of thin plates. Further, in some embodiments, at least one of the thin plates circumferentially overlaps another of the thin plates. In still other alternative embodiments, the first flexible element 220*a* includes any suitably flexible structure that enables the seal 200** to function as described herein.

As best seen in this view, the seal 200 can include a first backing plate **240*a*. The first backing plate 240*a* can be coupled to the rotor 120 and positioned adjacent to the first flexible element 220*a*. The first backing plate 240*a* can extend circumferentially around the rotor 120, either partially or fully. In this example, the first backing plate 240*a*** is positioned forward of the first flexible element 220*a*. However, in other examples, the first backing plate 240*a* is positioned aft of the first flexible element 220*a*. The first backing plate 240*a* can be provided to prevent the first flexible element 220*a* from being damaged and/or plastically deformed when it experiences a centrifugal load when the rotor 120 is rotating.

As best seen in FIG. 3, the first backing plate 240*a* can at least partially support, i.e., bear a partial load of the first flexible element 220*a*. More particularly, the first backing plate 240*a* can be bent such that it deviates from the radial direction R. For example, the first backing plate 240*a* can have an aft surface that extends in a first direction 222*a*, which forms a first angle 223*a* between the radial direction R and the first direction 222*a*, the first angle 223*a* being forty five degrees or less, such as thirty five degrees or less, such as fifteen degrees or less. Similarly, the first flexible element 220*a* can be bent such that it deviates from the radial direction R. For example, the first flexible element 220*a* can also extend in the first direction 222*a* and can be pressed against the first backing plate 240*a*. Even though shown as extending toward the aft side of the component assembly 100, it should be understood that the first flexible element 220*a* and the first backing plate 240*a* can extend toward the forward side of the component assembly 100.

In some examples, the seal 200, which can include the first backing plate 240*a* and/or the first flexible element 220*a*, can be configured the same as, or similarly to, the seal 100, which can include the retaining plate 106 and/or the flexible element 110, of U.S. application Ser. No. 14/869,538 filed Sep. 29, 2015, which is hereby incorporated by reference in its entirety. In some examples, the seal 200, which can include the first backing plate 240*a* and/or the first flexible element 220*a*, can be configured the same as, or similarly to, the seal 100, which can include the retaining plate 122 and/or the flexible element 124, of U.S. application Ser. No. 15/248,161 filed Aug. 26, 2016, which is hereby incorporated by reference in its entirety.

Figure 4:
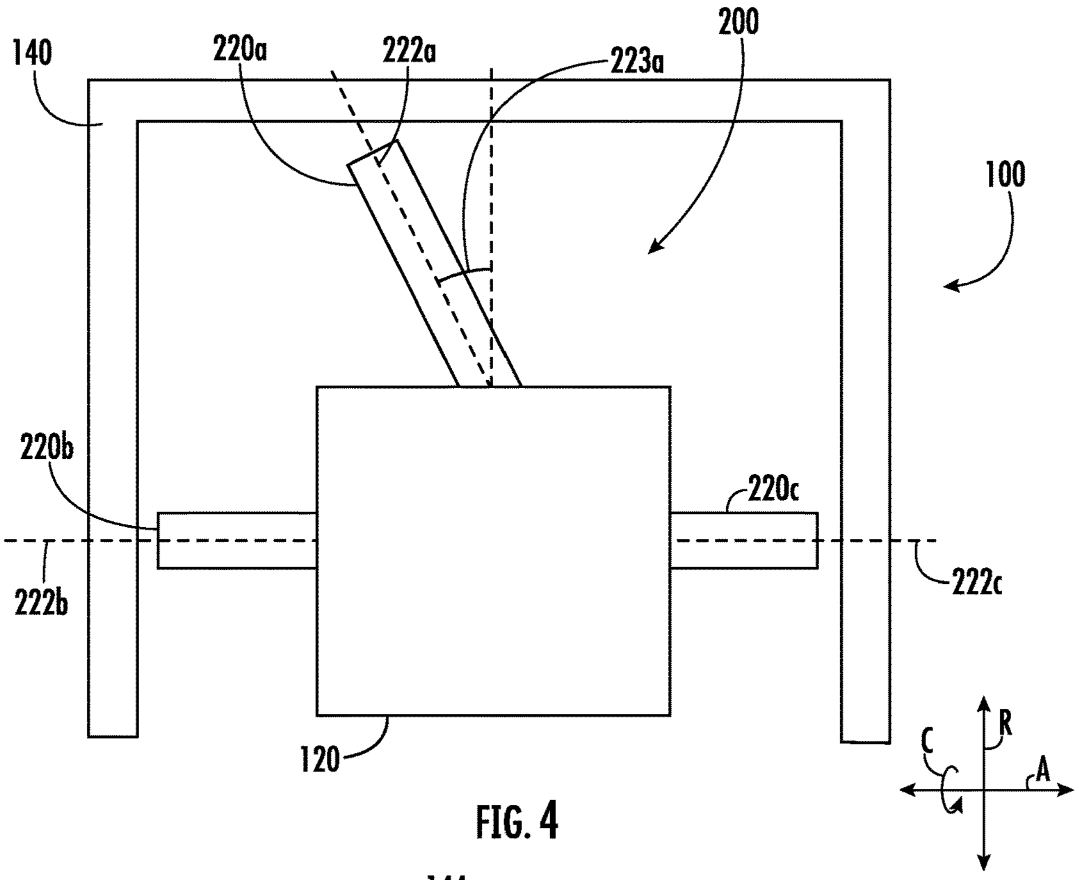
FIG. 4 is a schematic, cross-sectional view of a component assembly, according to an example embodiment.

Referring now to FIG. 4, a schematic, cross-sectional view of a component assembly 100 with a seal 200 is depicted, according to an example embodiment. In this example, the seal 200 includes the first flexible element 220*a*, a second flexible element 220*b*, and a third flexible element 220*c*. The first flexible element 220*a*, the second flexible element 220*b*, and the third flexible element 220*c* can be configured the same as, or similarly to, the first flexible element 220*a* as described in reference to FIG. 3. Even though not shown, the seal 200 can also include a backing plate for each of the first flexible element 220*a*, the second flexible element 220*b*, and the third flexible element 220*c*, which can each be configured the same as, or similarly to, the first backing plate 240*a* as described in reference to FIG. 3.

The first flexible element 220*a*, the second flexible element 220*b*, and the third flexible element 220*c* can each be coupled to the rotor 120 and can each extend circumferentially, partially or fully, around the axial direction A. The first flexible element 220*a* can extend in the first direction 222*a*, which forms the first angle 223*a* between the radial direction R and the first direction 222*a*, the first angle 223*a* being forty five degrees or less, such as thirty five degrees or less, such as fifteen degrees or less. In this example, the first flexible element 220*a* extends towards the forward direction (left side of page), but in other examples, can extend in the aft direction (right side of page). The second flexible element 220*b* can extend in a second direction 222*b* and the third flexible element 220*c* can extend in a third direction 222*c*. In this example, the second direction 222*b* and the third direction 222*c* are the same as the axial direction; however, the second direction 222*b* and/or the third direction 222*c* could deviate from the axial direction A. For example, the second direction 222*b* could deviate from the axial direction A so that a second angle 223*b* (see FIG. 5) is formed between the axial direction A and the second direction 222*b*, the second angle 223*b* being forty five degrees or less, such as thirty five degrees or less, such as fifteen degrees or less. Similarly, the third direction 222*c* could deviate from the axial direction A so that a third angle 223*c* (see FIG. 5) is formed between the axial direction A and the third direction 222*c*, the third angle 223*c* being forty five degrees or less, such as thirty five degrees or less, such as fifteen degrees or less. In this example, the second flexible element 220*b* extends in the forward direction and the third flexible element 220*c* extends in the aft direction. Additionally, the second angle 223*b* or the third angle 223*c* can be negative or positive such that the second direction 222*b* or the third direction 222*c* can be in the inward direction.

As will be explained more, the first flexible element 220*a* can be provided to form a radial interface with the stator 140 to prevent a fluid from leaking between the rotor 120 and the stator 140. Similarly, the second flexible element 220*b* and/or the third flexible element 220*c* can be provided to form an axial interface with the stator 140 to prevent the fluid from leaking between the rotor 120 and the stator 140. In some examples, which will also be explained in more detail, the first flexible element 220*a*, the second flexible element 220*b*, and/or the third flexible element 220*c* can be provided to form both an axial interface and a radial interface with the stator 140 to prevent the fluid from leaking between the rotor 120 and the stator.

Figure 5:
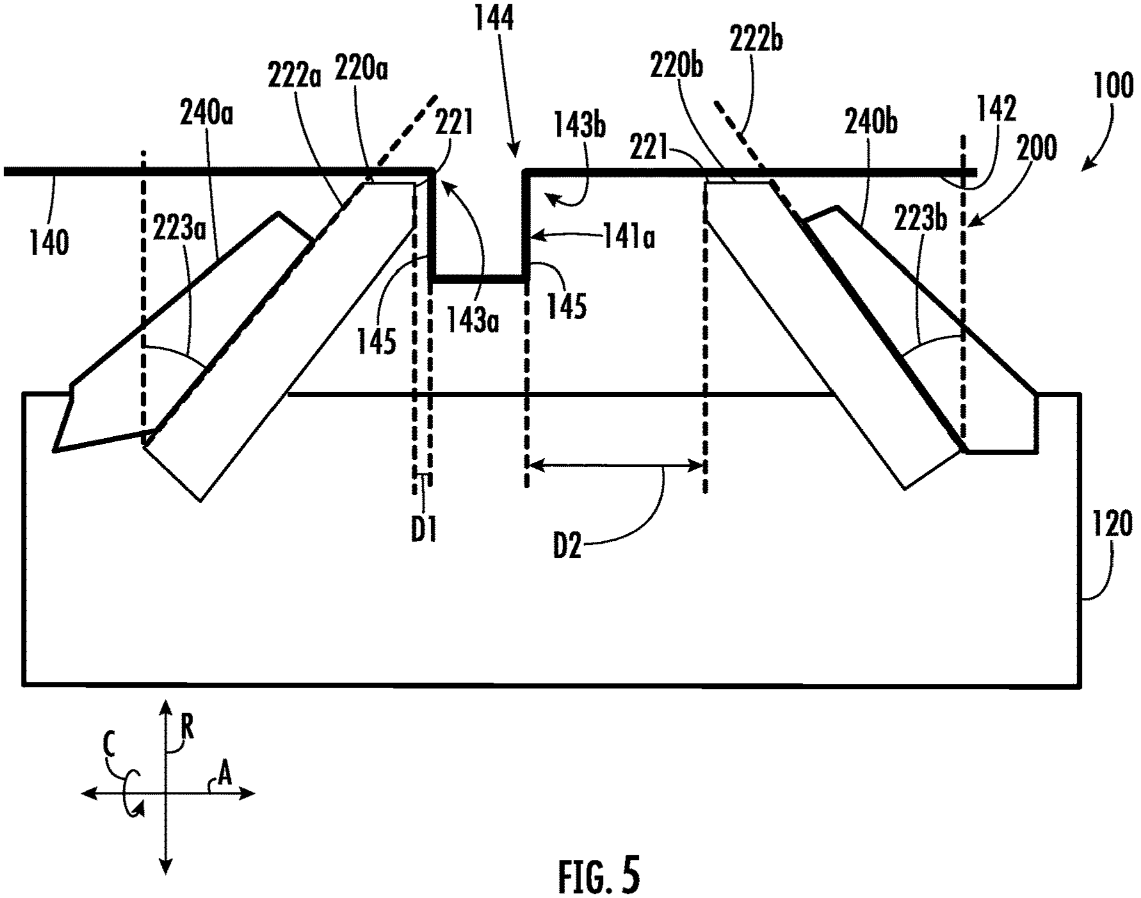
FIG. 5 is a schematic, cross-sectional view of a component assembly, according to an example embodiment.

Referring now to FIG. 5, a schematic, cross-sectional view of a component assembly 100 with a seal 200 is depicted, according to an example embodiment. In this example, the seal 200 includes a first flexible element 220*a*, a first backing plate 240*a*, a second flexible element 220*b*, and a second backing plate 240*b*. In other examples, the seal 200 does not include the first backing plate 240*a* and/or the second backing plate 240*b*. The first flexible element 220*a*, the first backing plate 240*a*, the second flexible element 220*b*, and the second backing plate 240*b* can be configured similarly, or the same as, the examples provided in reference to FIG. 3 and FIG. 4.

In this example, the stator 140 includes a first protrusion 141*a* that extends radially inward from the stator 140 and toward the rotor 120. Even though the first protrusion 141*a* has a rectangular cross-section in this example, it should be understood that the first protrusion 141*a* can have any shape. The first protrusion 141*a* extends radially inward from an axially and circumferentially extending surface 142 of the stator 140, in this example. The first protrusion 141*a* defines a first notch 143*a* and a second notch 143*b*. The first notch 143*a* and the second notch 143*b* are each defined where a root end 144 of the first protrusion 141*a* and the axially and circumferentially extending surface 142 of the stator 140 join. More specifically, the first notch 143*a* and the second notch 143*b* are each defined at the locations where the axially and circumferentially extending surface 142 of the stator 140 meets with the radially extending surfaces 145 of the first protrusion 141*a*. Even though shown as a sharp corner, it should be understood that the first notch 143*a* and the second notch 143*b* can be a fillet, a chamfer, or any other shape. Also, in this example, the first protrusion 141*a* is located between the first flexible element 220*a* and the second flexible element 220*b*.

As shown, the first backing plate 240*a*, the first flexible element 220*a*, the second backing plate 240*b*, and the second flexible element 220*b* each extend toward the first protrusion 141*a*. Stated differently, the first flexible element 220*a* and the first backing plate 240*a* each extend in the first direction 222*a*, the first direction 222*a* being toward an aft direction when the first protrusion 141*a* is aft of the first flexible element 220*a* and the first backing plate 240*a*; the second flexible element 220*b* and the second backing plate 240*b* each extend in the second direction 222*b*, the second direction 222*b* being toward a forward direction when the first protrusion 141*a* is forward of the second flexible element 220*b* and the second backing plate 240*b*.

The first flexible element 220*a* and the second flexible element 220*b* can each have a tip 221, which is an extremity of the respective flexible element 220*a*, 220*b*. The tip 221 can be shaped to conform to the shape of the respective notch 143*a* or 143*b* of the first protrusion 141*a*. As depicted, the tips 221 have a sharp angled tip to conform to the sharp corner of notches 143*a*, 143*b* of the first protrusion 141*a*. However, when the first notch 143*a* and the second notch 143*b* are, for example, chamfered, the tips 221 of the first flexible element 220*a* and the second flexible element 220*b* can each have a bullnose or demi-bullnose shape so that they are also rounded. Similarly, when the first notch 143*a* and the second notch 143*b* are, for example, beveled, the tips 221 of the first flexible element 220*a* and the second flexible element 220*b* can also include a beveled edge to conform to the shape of the beveled corner.

As mentioned, the rotor 120 and the stator 140 may have different coefficients of thermal expansion and may move either axially and/or radially in relation to each other. As such, the seal 200 can be configured so that the tip 221 of one of the first flexible element 220*a* or the second flexible element 220*b* is configured to be positioned proximate to its respective notch 143*a*, 143*b* when the component assembly 100 is operating in a relatively hot state, and configured so that the tip 221 of the other one of the first flexible element 220*a* or the second flexible element 220*b* is configured to be positioned proximate to its respective notch 143*a*, 143*b* when the component assembly 100 is operating in a relatively cool state.

For example, and as depicted, a first distance D1 from the tip 221 of the first flexible element 220*a* to the first protrusion 141*a* could be zero so that it is touching, or in close proximity, such as within three mm, such as within two mm, such as within one mm of the first notch 143*a* when the component assembly 100 is operating in a relatively hot state, whereas a second distance D2 from the tip 221 of the second flexible element 220*b* to the first protrusion 141*a* could be greater than first distance D1. For example, the second distance D2 could be at least one mm and up to ten mm, such as at least two mm and up to ten mm, such as at least three mm and up to ten mm, when the component assembly 100 is operating in a relatively hot state.

Conversely, and not depicted, the second distance D2 from the tip 221 of the second flexible element 220*b* to the first protrusion 141*a* could be zero so that it is touching, or in close proximity, such as within three mm, such as within two mm, such as within one mm of the second notch 143*b* when the component assembly 100 is operating in a relatively cool state, whereas the first distance D1 from the tip 221 of the first flexible element 220*a* to the first protrusion 141*a* could be greater than second distance D2. For example, the first distance D1 could be at least one mm and up to ten mm, such as at least two mm and up to ten mm, such as at least three mm and up to ten mm, when the component assembly 100 is operating in a relatively cool state.

Figure 6A:
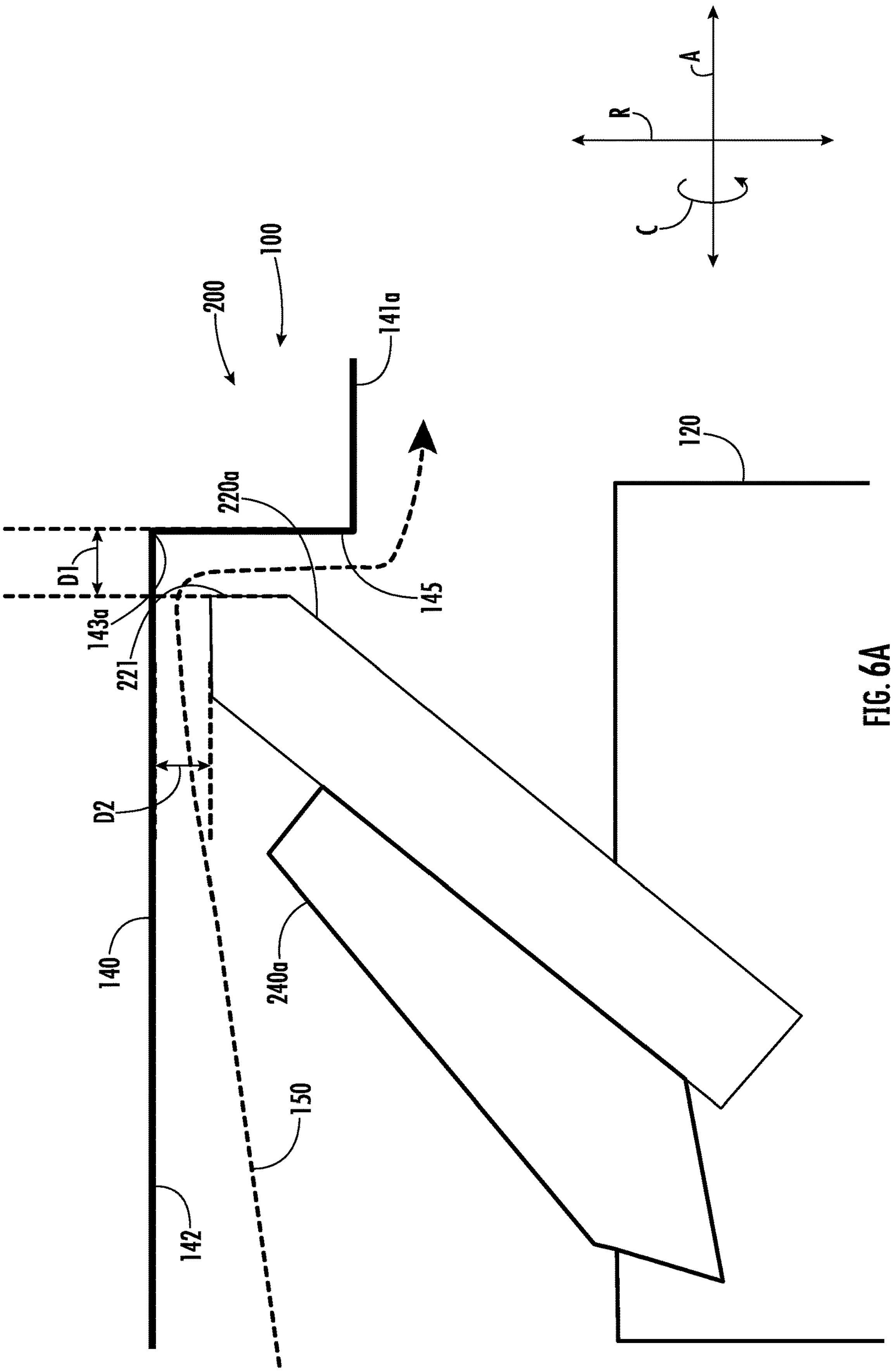
FIG. 6A is a schematic, cross-sectional view of a component assembly, according to an example embodiment.
Figure 6B:
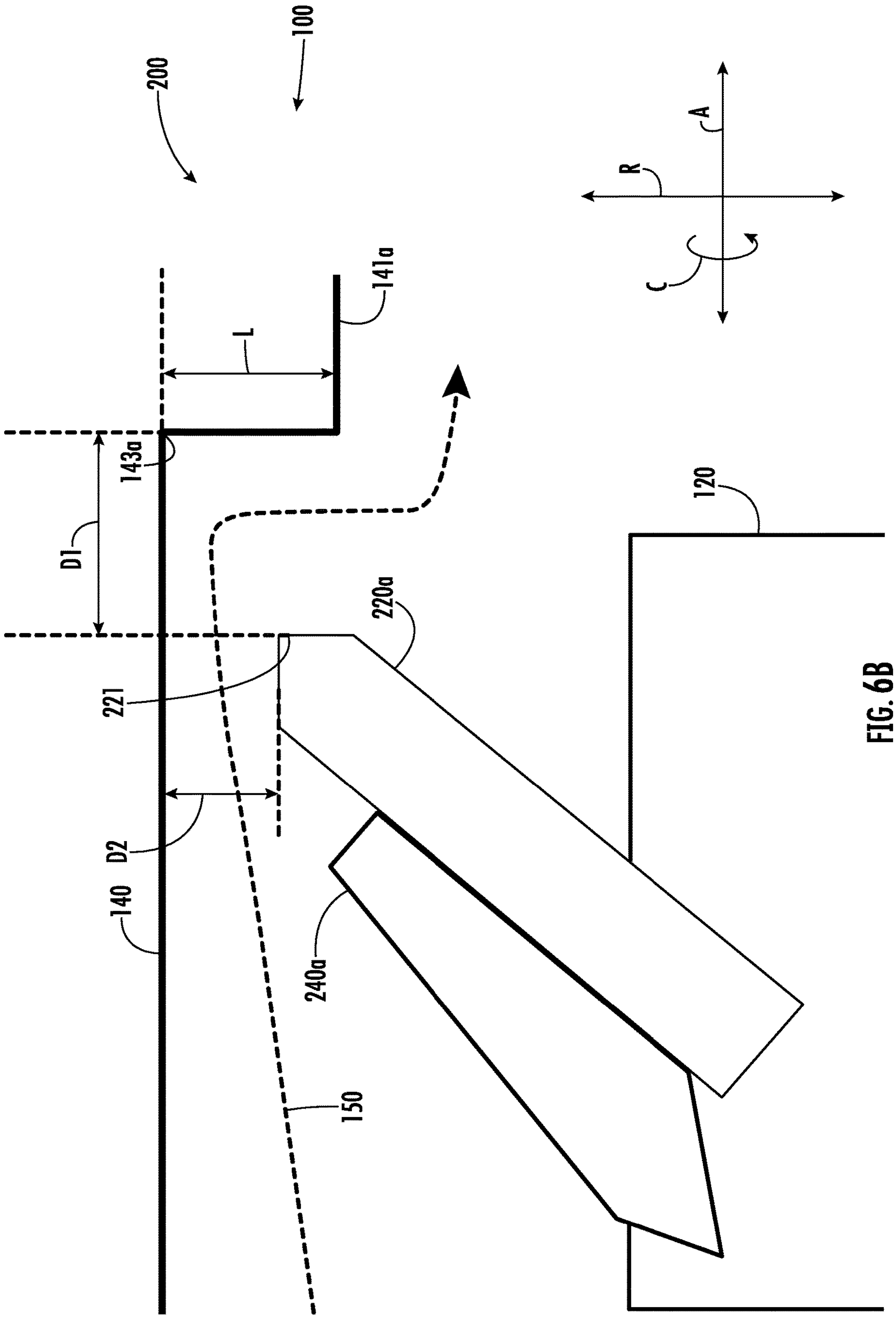
FIG. 6B is a schematic, cross-sectional view of the component assembly of FIG. 6A, according to an example embodiment.

Referring now to FIG. 6*a* and FIG. 6*b*, a schematic, cross-sectional view of a component assembly 100 with a seal 200 is depicted, according to an example embodiment. More particularly, FIG. 6*a* depicts the component assembly 100 when the rotary machine is operating in a relatively hot state, whereas FIG. 6*b* depicts the component assembly 100 when the rotary machine is operating in a relatively cool state. The seal 200 of FIG. 6*a* and FIG. 6*b* can be configured the same as, or similarly as, the seal 200 of FIG. 5; however, in this example, the seal 200 only includes the first backing plate 240*a* and the first flexible element 220*a*. However, in other examples, the seal 200 includes more than the singular first backing plate 240*a* and the first flexible element 220*a*. As best seen in these views, the first flexible element 220*a* of the seal 200 is positioned proximate the first notch 143*a* defined by the first protrusion 141*a* to prevent a fluid, such as a hot gas, from flowing from a position forward of the seal 200 to a position aft of the seal 200. Also, by positioning the tip 221 of the first flexible element 220*a* proximate to the first notch 143*a* defined by the first protrusion 141*a*, any gas that traverses past the seal 200 follows a tortuous path 150.

Also, as mentioned, the rotor 120 and the stator 140 may have different coefficients of thermal expansion and may move either axially and/or radially in relation to each other. As such, the seal 200 can be configured so that the tip 221 of the first flexible element 220*a* is configured to be positioned proximate to its respective first notch 143*a* when the component assembly 100 is operating in a relatively hot state, and configured so that the tip 221 of the first flexible element 220*a* is configured to be positioned further away from its respective first notch 143*a* when the component assembly 100 is operating in a relatively cool state.

For example, and as depicted in FIG. 6*a*, a first distance D1 along the axial direction A from the tip 221 of the first flexible element 220*a* to the first protrusion 141*a* could be zero so that it is touching, or in close proximity, such as within three mm, such as within two mm, such as within one mm of the first notch 143*a* when the component assembly 100 is operating in a relatively hot state, and a second distance D2 along the radial direction R from the tip 221 of the first flexible element 220*a* to the stator 140 could be zero so that it is touching, or in close proximity, such as within three mm, such as within two mm, such as within one mm of the stator 140 when the component assembly 100 is operating in a relatively hot state.

Conversely, and as depicted in FIG. 6*b*, the first distance D1 may be greater when the component assembly 100 is operating in a relatively cool state (FIG. 6*b*) than when the component assembly 100 is operating in a relatively hot state (FIG. 6*a*). Also, the second distance D2 may be greater when the component assembly 100 is operating in a relatively cool state (FIG. 6*b*) than when the component assembly 100 is operating in a relatively hot state (FIG. 6*a*). In some examples, the first distance D1 and/or the second distance D2 could be at least one mm and up to ten mm, such as at least two mm and up to ten mm, such as at least three mm and up to ten mm, when the component assembly 100 is operating in a relatively cool state.

Referring briefly back to FIG. 6*a*, the first flexible element 220*a* can form both an axial interface and a radial interface with the stator 140 to prevent the fluid from leaking between the rotor 120 and the stator 140. More particularly, the tip 221 of the first flexible element 220*a* can form the axial interface with the radially extending surface 145 of the first protrusion 141*a* of the stator 140 and the tip 221 of the first flexible element 220*a* can form the radial interface with the circumferentially extending surface 142 of the stator 140. As used herein, "interface" does not necessarily mean that contact must occur. Instead, the formation of an interface can occur with contact of the first flexible element 220*a* with the stator 140 or when the first flexible element 220*a* is in close proximity with the stator 140. The axial and radial interface between the first flexible element 220*a* and the stator 140 can prevent the fluid from leaking between the first flexible element 220*a* and the stator 140.

Additionally, as best seen in the views of FIG. 6*a* and FIG. 6*b*, the first notch should be sized to accommodate for the differing first distance D1 and the second distance D2 when the component assembly is operating in a relatively cool state versus when the component assembly 100 is operating in a relatively hot state. For example, the first protrusion 141*a* should have a radial length L that is greater than the second distance D2 when the component assembly 100 is operating in a relatively cool state (FIG. 6*b*).

Figure 7:
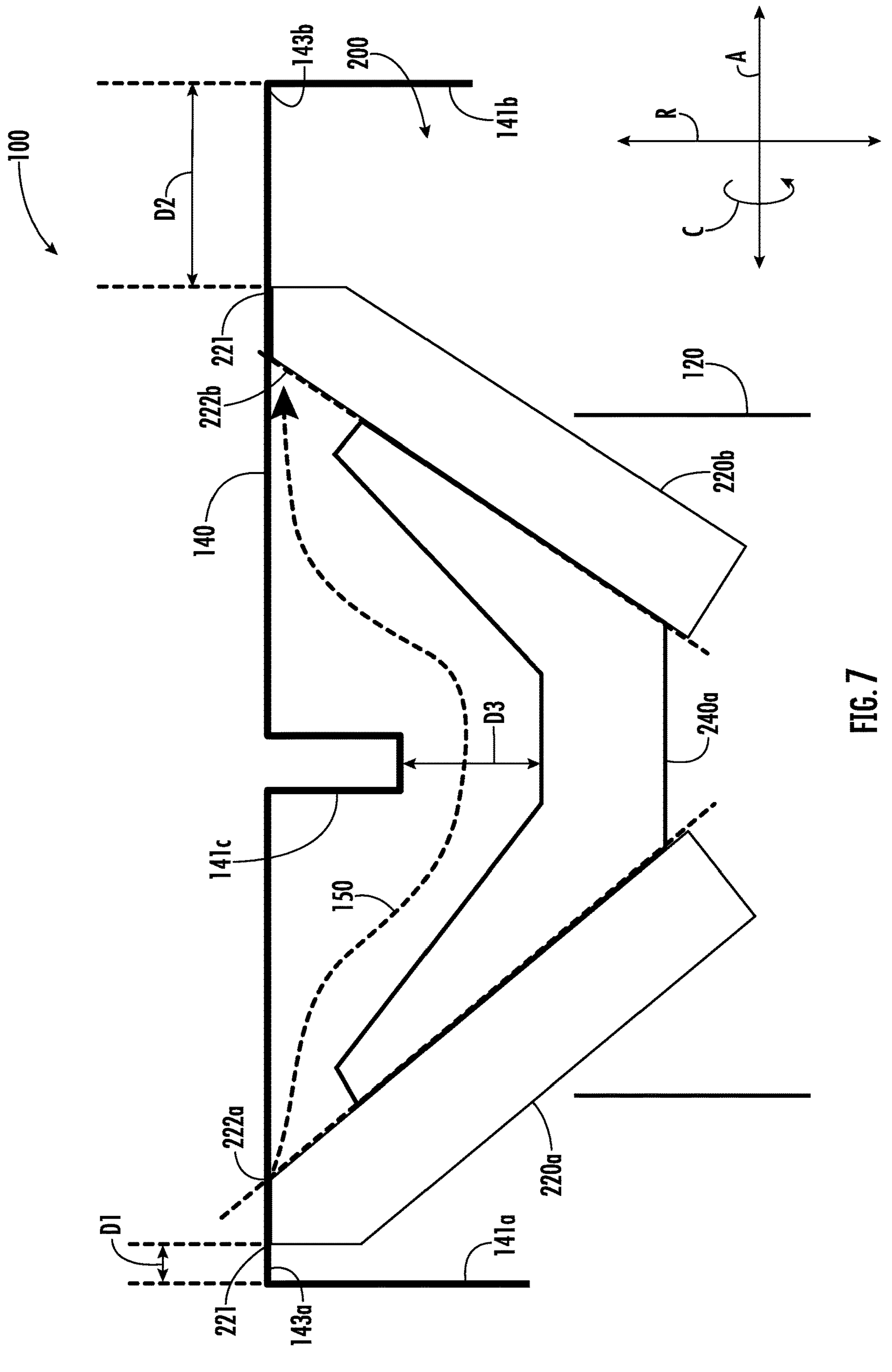
FIG. 7 is a schematic, cross-sectional view of a component assembly, according to an example embodiment.

Referring now to FIG. 7, a schematic, cross-sectional view of a component assembly 100 with a seal 200 is depicted, according to an example embodiment. The seal 200 of FIG. 7 can be configured the same as, or similarly as, the seal 200 of FIG. 5; however, in this example, the first flexible element 220*a* extends in a first direction 222*a* that is toward a forward side of the seal 200 (left side of page) and the second flexible element 220*b* extends in a second direction 222*b* that is toward an aft side of the seal 200 (right side of page). Additionally, neither the first flexible element 220*a* nor the second flexible element 220*b* extend toward a notch that is defined by a protrusion that is positioned axially between the first flexible element 220*a* and the second flexible element 220*b*, such as third protrusion 141*c*. Instead, the first flexible element 220*a* extends toward a first notch 143*a* that is defined by a first protrusion 141*a* that is positioned axially forward of the first flexible element 220*a* and the second flexible element 220*b* extends toward a second notch 143*b* that is defined by a second protrusion 141*b* that is positioned axially aft of the second flexible element 220*b*.

Also, as depicted, the seal 200 can include a first backing plate 240*a* that is located between the first flexible element 220*a* and the second flexible element 220*b*. Even though the first backing plate 240*a* in this example is a unitary component that provides support for both the first flexible element 220*a* and the second flexible element 220*b*, in other examples, the seal 200 can include two separate backing plates that each support a different one of the first flexible element 220*a* and the second flexible element 220*b*.

In this example, a first distance D1 from the tip 221 of the first flexible element 220*a* to the first protrusion 141*a* could be zero so that it is touching, or in close proximity, such as within three mm, such as within two mm, such as within one mm of the first notch 143*a* when the component assembly 100 is operating in a relatively cool state, whereas a second distance D2 from the tip 221 of the second flexible element 220*b* to the second protrusion 141*b* could be greater than the first distance D1. For example, the second distance D2 could be at least one mm and up to ten mm, such as at least two mm and up to ten mm, such as at least three mm and up to ten mm, when the component assembly 100 is operating in a relatively cool state.

Conversely, and not depicted, the second distance D2 from the tip 221 of the second flexible element 220*b* to the second protrusion 141*b* could be zero so that it is touching, or in close proximity, such as within three mm, such as within two mm, such as within one mm of the second notch 143*b* when the component assembly 100 is operating in a relatively hot state, whereas the first distance D1 from the tip 221 of the first flexible element 220*a* to the first protrusion 141*a* could be greater than second distance D2. For example, the first distance D1 could be at least one mm and up to ten mm, such as at least two mm and up to ten mm, such as at least three mm and up to ten mm, when the component assembly 100 is operating in a relatively hot state.

Additionally, the seal 200 can be configured so that the tip 221 of the first flexible element 220*a* and the second flexible element 220*b* are configured to be positioned approximately equidistant to their respective notches 143*a*, 143*b* when the component assembly 100 is operating at a median temperature, the median temperature being between the relatively hot state and the relatively cool state. The relatively hot state can be the hottest temperature experienced by the component assembly 100 when the component assembly 100 is operating normally, whereas the relatively cool state can be the coolest temperature experienced by the component assembly 100 when the component assembly 100 is operating normally. In the example of a gas turbine engine, the relatively hot state could be experienced when an aircraft upon which the gas turbine engine is installed is taking-off, whereas the relatively cool state could be experienced when the gas turbine engine is initially turned on and on the ground.

As mentioned, the stator 140, in this example, also includes the third protrusion 141*c* that is positioned axially between the first flexible element 220*a* and the second flexible element 220*b*. The third protrusion 141*c* that is positioned axially between the first flexible element 220*a* and the second flexible element 220*b* can partially define the tortuous path 150. Again, as mentioned, the rate of thermal expansion between the stator 140 and the rotor 120 can differ. As such, the rotor 120 may move closer to the stator 140 when the component assembly 100 is operating in a relatively hot state and the rotor 120 may move further from the stator 140 when the component assembly 100 is operating in a relatively cool state. A third distance D3 between the third protrusion 141*c* and the first backing plate 240*a*, or between the third protrusion 141*c* and the rotor 120 when the first backing plate 240*a* is not positioned radially between the third protrusion 141*c* and the first backing plate 240*a*, can be minimized when the component assembly 100 is operating in a relatively hot state. For example, the third distance D3 could be less than ten mm, such as less than five mm, such as less than four mm when the component assembly 100 is operating in a relatively hot state. Minimizing the third distance D3 when the component assembly 100 is operating in a relatively hot state can further decrease the amount of fluid, such as a hot gas, that is able to traverse through the seal 200 by increasing the number of curves and the slope of the curves on the tortuous path 150.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A seal for a rotor, the seal for preventing a gas from flowing from a position forward of the seal to a position aft of the seal, the rotor defining an axial direction, a circumferential direction, and a radial direction, the seal comprising: a first flexible element coupled to the rotor and extending in a first direction that is within forty five degrees of the axial direction; and a second flexible element coupled to the rotor and extending in a second direction that is within forty five degrees of the axial direction or within forty five degrees of the radial direction.

The seal of one or more of these clauses, wherein the first flexible element comprises a first plurality of brush bristles and the second flexible element comprises a second plurality of brush bristles.

The seal of one or more of these clauses, wherein the second direction is within forty five degrees of the radial direction and the seal comprises a third flexible element coupled to the rotor and extending in a third direction that is within forty five degrees of the axial direction, wherein the first flexible element extends in a forward direction and the third flexible element extends in an aft direction.

A rotary machine comprising: a rotor defining an axial direction, a circumferential direction, and a radial direction; a stator that extends at least partially in the circumferential direction and at least partially around the rotor; and a seal coupled to the rotor and positioned between the stator and the rotor, the seal comprising: a first flexible element coupled to the rotor and extending in a first direction that is within forty five degrees of the axial direction; and a second flexible element coupled to the rotor and extending in a second direction that is within forty five degrees of the axial direction or within forty five degrees of the radial direction.

The rotary machine of one or more of these clauses, wherein the first flexible element comprises a first plurality of brush bristles and the second flexible element comprises a second plurality of brush bristles.

The rotary machine of one or more of these clauses, wherein the second direction is within forty five degrees of the radial direction and the seal comprises a third flexible element coupled to the rotor and extending in a third direction that is within forty five degrees of the axial direction, wherein the first flexible element extends in a forward direction and the third flexible element extends in an aft direction.

A rotary machine comprising: a rotor defining an axial direction, a circumferential direction, and a radial direction; a stator that extends at least partially in the circumferential direction and at least partially around the rotor, the stator comprising a first protrusion that defines a first notch; and a seal coupled to the rotor and positioned between the stator and the rotor, the seal comprising: a first flexible element having a first tip, wherein the first tip is positioned in close proximity to the first notch.

The rotary machine of one or more of these clauses, wherein the rotary machine is a gas turbine engine having a compressor section, a combustion section, a turbine section, and a shaft that couples the compressor section to the turbine section, wherein the rotor is coupled to, and rotatable with, the shaft.

The rotary machine of one or more of these clauses, where the stator has an axially and circumferentially extending surface and the first protrusion has a radially extending surface, wherein the first notch is defined at a location where the axially and circumferentially extending surface of the stator meets with the radially extending surface of the first protrusion.

The rotary machine of one or more of these clauses, wherein the first tip has a first shape that conforms to a shape of the first notch.

The rotary machine of one or more of these clauses, wherein the first flexible element comprises a plurality of brush bristles.

The rotary machine of one or more of these clauses, wherein a first distance is defined between the first tip of the first flexible element and the first notch, wherein the first distance is greater than or equal to zero millimeter (mm) and less than or equal to three mm.

The rotary machine of one or more of these clauses, wherein the first distance is greater than or equal to zero mm and less than or equal to three mm when the rotary machine is operating in a relatively hot state, wherein the first protrusion defines a second notch, wherein the seal comprises: a second flexible element having a second tip, wherein a second distance is defined between the second tip of the second flexible element and the second notch, wherein the second distance is greater than or equal to zero mm and less than or equal to three mm when the rotary machine is operating in a relatively cool state, wherein the first distance is less than the second distance when the rotary machine is operating in the relatively hot state and the first distance is greater than the second distance when the rotary machine is operating in the relatively cool state.

The rotary machine of one or more of these clauses, wherein the first protrusion is positioned between the first flexible element and the second flexible element, and the first flexible element extends in a first direction that is within forty five degrees of the radial direction and the second flexible element extends in a second direction that is within forty five degrees of the radial direction.

The rotary machine of one or more of these clauses, wherein the first distance is greater than or equal to zero mm and less than or equal to three mm when the rotary machine is operating in a relatively cool state, wherein the stator comprises a second protrusion that defines a second notch, wherein the seal comprises: a second flexible element having a second tip, wherein a second distance is defined between the second tip of the second flexible element and the second notch, wherein the second distance is greater than or equal to zero mm and less than or equal to three mm when the rotary machine is operating in a relatively hot state, wherein the first distance is less than the second distance when the rotary machine is operating in the relatively cool state and the first distance is greater than the second distance when the rotary machine is operating in the relatively hot state.

The rotary machine of one or more of these clauses, wherein the first flexible element and the second flexible element are positioned between the first protrusion and the second protrusion.

The rotary machine of one or more of these clauses, wherein the stator comprises a third protrusion that is positioned axially between the first flexible element and the second flexible element.

The rotary machine of one or more of these clauses, wherein the first distance is greater than or equal to zero mm and less than or equal to three mm when the rotary machine is operating in a relatively hot state, and the first tip of the first flexible element is further away from the first notch when the rotary machine is operating in a relatively cool state, wherein the first distance is an axial distance.

The rotary machine of one or more of these clauses, wherein the first distance is greater than or equal to one mm when the rotary machine is operating in a relatively cool state.

The rotary machine of one or more of these clauses, wherein a second distance is defined between the stator and the first tip of the first flexible element, wherein a radial length of the first protrusion is greater than the second distance.

We claim:

1. A rotary machine comprising:
- a rotor defining an axial direction, a circumferential direction, and a radial direction;
- a stator that extends at least partially in the circumferential direction and at least partially around the rotor, the stator comprising a first protrusion that defines a first notch and a second notch, wherein the rotor and stator have different coefficients of thermal expansion; and
- a seal coupled to the rotor and positioned between the stator and the rotor, the seal comprising:
  - a first flexible element having a first tip, wherein the first tip is positioned in close proximity to the first notch; and
  - a second flexible element having a second tip, wherein the second tip is positioned in close proximity to the second notch, wherein a first distance is defined between the first tip of the first flexible element and the first notch, wherein the first distance is greater than or equal to zero millimeter (mm) and less than or equal to three mm when the rotary machine is operating in a relatively hot state,
  - wherein a second distance is defined between the second tip of the second flexible element and the second notch, wherein the second distance is greater than or equal to zero mm and less than or equal to three mm when the rotary machine is operating in a relatively cool state, and
  - wherein the first distance is less than the second distance when the rotary machine is operating in the relatively hot state and the first distance is greater than the second distance when the rotary machine is operating in the relatively cool state.

2. The rotary machine of claim 1, wherein the rotary machine is a gas turbine engine having a compressor section, a combustion section, a turbine section, and a shaft that couples the compressor section to the turbine section, wherein the rotor is coupled to, and rotatable with, the shaft.

3. The rotary machine of claim 1, where the stator has an axially and circumferentially extending surface and the first protrusion has a radially extending surface, wherein the first notch and the second notch are defined at a location where the axially and circumferentially extending surface of the stator meets with the radially extending surface of the first protrusion.

4. The rotary machine of claim 1, wherein the first tip has a first shape that conforms to a shape of the first notch, and the second tip has a second shape that conforms to a shape of the second notch.

5. The rotary machine of claim 1, wherein the first flexible element and second flexible element comprises a plurality of brush bristles.

6. The rotary machine of claim 1, wherein the first protrusion is positioned between the first flexible element and the second flexible element, and the first flexible element extends in a first direction that is within forty five degrees of the radial direction and the second flexible element extends in a second direction that is within forty five degrees of the radial direction.

7. The rotary machine of claim 1, wherein the first tip of the first flexible element is further away from the first notch when the rotary machine is operating in the relatively cool state, wherein the first distance is an axial distance.

8. The rotary machine of claim 7, wherein the first distance is greater than or equal to one mm when the rotary machine is operating in a relatively cool state.

9. The rotary machine of claim 7, wherein a third distance is defined between the stator and the first tip of the first flexible element, wherein a radial length of the first protrusion is greater than the second distance.

10. A rotary machine comprising:
- a rotor defining an axial direction, a circumferential direction, and a radial direction;
- a stator that extends at least partially in the circumferential direction and at least partially around the rotor, the stator comprising a first protrusion that defines a first notch and a second protrusion that defines a second notch, wherein the rotor and stator have different coefficients of thermal expansion; and
- a seal coupled to the rotor and positioned between the stator and the rotor, the seal comprising:
  - a first flexible element having a first tip, wherein the first tip is positioned in close proximity to the first notch; and
  - a second flexible element having a second tip, wherein the second tip is positioned in close proximity to the second notch, wherein a first distance is defined between the first tip of the first flexible element and the first notch, wherein the first distance is greater than or equal to zero mm and less than or equal to three mm when the rotary machine is operating in a relatively cool state,
  - wherein a second distance is defined between the second tip of the second flexible element and the second notch, wherein the second distance is greater than or equal to zero mm and less than or equal to three mm when the rotary machine is operating in a relatively hot state, and
  - wherein the first distance is less than the second distance when the rotary machine is operating in the relatively cool state and the first distance is greater than the second distance when the rotary machine is operating in the relatively hot state.

11. The rotary machine of claim 10, wherein the first flexible element and the second flexible element are positioned between the first protrusion and the second protrusion.

12. The rotary machine of claim 10, wherein the stator comprises a third protrusion that is positioned axially between the first flexible element and the second flexible element.

* * * * *